H. W. PELL.
DROP PERCH FOR VEHICLES.
No. 10,616. Reissued June 23, 1885.
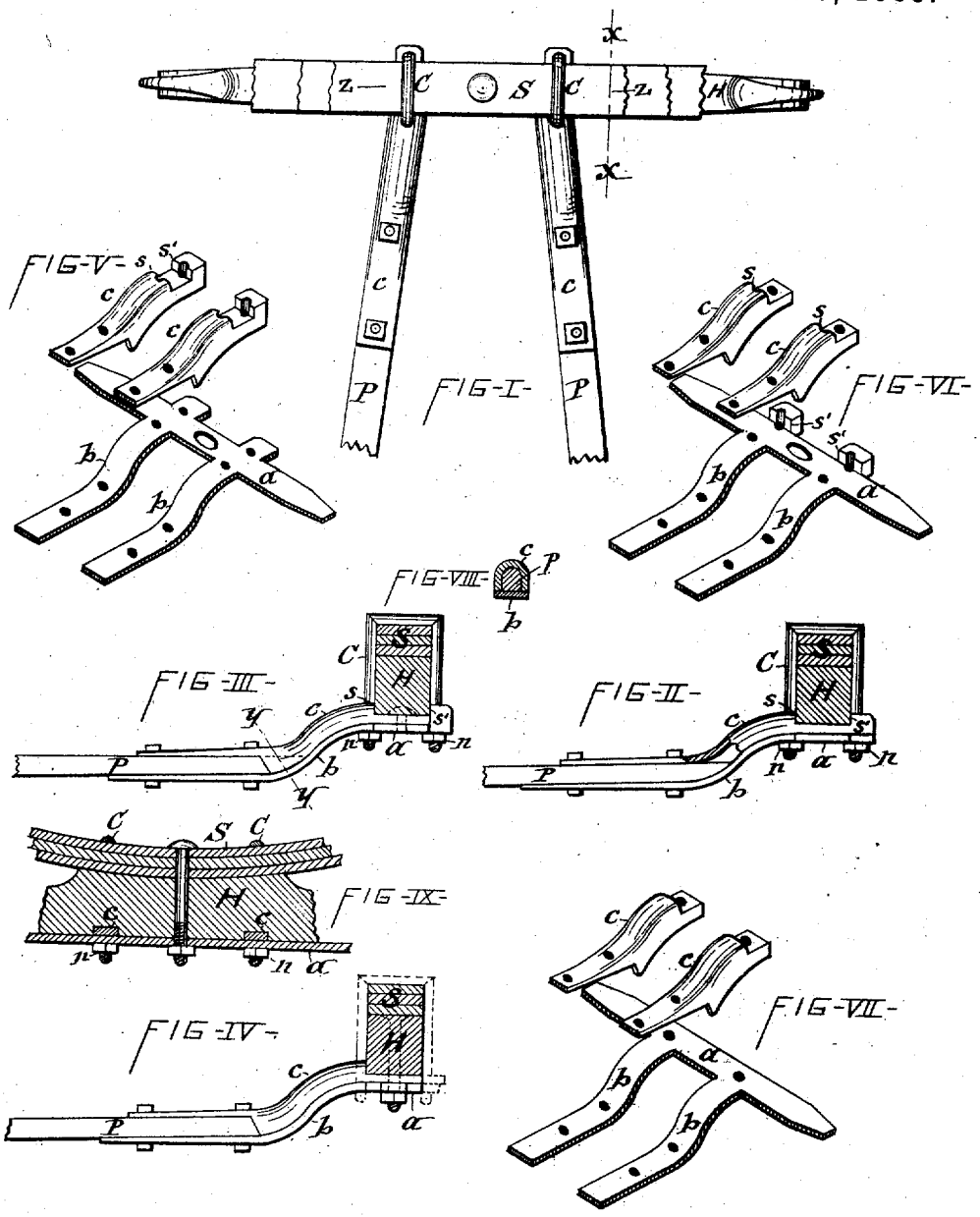
WITNESSES
C. Bendixon
Wm. C. Raymond.
INVENTOR
Henry W. Pell
per Duell, Lessot & Hay
his Attys

UNITED STATES PATENT OFFICE.

HENRY W. PELL, OF ROME, NEW YORK.

DROP-PERCH FOR VEHICLES.

SPECIFICATION forming part of Reissued Letters Patent No. 10,616, dated June 23, 1885.

Original No. 314,714, dated March 31, 1885. Application for reissue filed April 7, 1885.

*To all whom it may concern:*

Be it known that I, HENRY W. PELL, a citizen of the United States, residing at Rome, in the county of Oneida and State of New York, have invented certain new and useful Improvements in Drop-Perches for Vehicles, of which the following, taken in connection with the accompanying drawings, is a full, clear, and exact description.

This invention consists in improved means for firmly and securely connecting two perches to the head-block of a vehicle, as hereinafter fully described, and specifically set forth in the claims.

The invention is clearly illustrated in the annexed drawings, wherein Figure I is a top view of the forward end of two perches, and their connection with the head-block and spring mounted thereon. Fig. II is a transverse section on line *x x*, Fig. I, with a portion of the side of the coupling-arm broken away to show the concavity of said arm and the extension of the perch into the same. Figs. III and IV illustrate modifications in the detail, construction, and combination of the aforesaid parts. Figs. V, VI, and VII are perspective views showing in detail the modifications of the construction of the transom-plate and perch-couplings. Fig. VIII is a transverse section on line *y y*, Fig. III, and Fig. IX is a longitudinal section on line *z z*, Fig. I.

Similar letters of reference indicate corresponding parts.

H represents the head-block; S, the spring mounted thereon; and P P denote two perches connected with the head-block by the following instrumentalities: The usual transom-plate, *a*, which is secured to the under side of the head-block, has integral with it two rearwardly-projecting arms, *b b*, which are deflected downward and extended under the end of the perch *p*, as shown in Figs. 2, 3, and 4 of the drawings. Over each of the arms *b b* is a brace, *c*, the rear end of which lies on top of the perch, and is secured thereto by bolts passing vertically through said parts and through the arms *b b*. The forward end of the brace is extended across the transom-plate *a*, and countersunk in the under side of the head-block, as shown in Fig. IX of the drawings, and the central or intermediate portion of the brace is formed concavo-convex, and deflected downward, corresponding to the arm *b*, and lies with the edges of its concave side on top of said arm.

The concavo-convex form of the brace *c* is easily produced from a comparatively-light bar by means of a drop-press with suitable dies, and said form imparts rigidity to the brace, and serves as a socket for the reception of the end of the perch, as illustrated in Fig. II of the drawings. The embrace of the end of the perch by the brace *c* obviates the danger of splitting the perch.

The concavo-convex portion of the brace terminates with a shoulder, *s*, by which it abuts against the rear of the head-block. The said brace and transom-plate *a* have in common their attachment to the head-block. Said attachment I prefer to make by means of the clip C, which embraces the spring S and head-block, and has its ends extended through the brace and transom-plate, and provided underneath the latter with nuts *n n*, by which to clamp the parts together.

If it is desired to fasten the spring to the head-block by a single clip at the center thereof, a bolt may be extended vertically through the head-block and through the brace and transom-plate, as shown in Fig. IV of the drawings. The connection of the perch with the head-block can be re-enforced by shoulders *s'*, either on the front edge of the transom-plate, as represented in Fig. IV of the drawings, or on the forward end of the braces, as shown in Fig. V of the drawings, which shoulders abut against the front of the head-block, as illustrated in Figs. II and III of the drawings.

It will be observed that in every instance the brace *c* is extended across the transom-plate, and has in common with it the attachment to the head-block, and is countersunk in the head-block, and thus securely retained in its position over the arms *b b* of the transom-plate.

Having described my invention, what I claim as new is—

1. In combination with the head-block and perch, the brace *c*, formed concave in cross-section between its points of attachment, substantially as described and shown.

2. In combination with the head-block and perch, the brace *c*, deflected downward from the head-block, and formed concave in cross-section, substantially as set forth and shown.

3. In combination with the head-block and perch, the brace *c*, provided with an abutting shoulder at the back of the head-block, and formed concave in cross-section, substantially as set forth and shown.

4. In combination with the head-block and perch, the brace *c*, provided with an abutting shoulder at the back of the head-block, and bent downward from the head-block, and formed concavo-convex in cross-section, substantially as described and shown.

5. In combination with the head-block, perch, and arm *b*, the brace *c*, formed concavo-convex in cross-section, and resting with the edges of its concave side on the arm *b*, substantially as set forth and shown.

6. In combination with the head-block H and arm *b*, the brace *c*, formed concavo-convex in cross-section, and resting with the edges of its concave side on top of the arm *b*, and the perch P, having its end inserted into the concavity of the brace *c*, substantially as described and shown.

7. In combination with the head-block H and perches P P, the transom-plate *a*, having the arms *b b* integral with it and extended under the perches, and the braces *c c* on top of the perches, and extended across the top of the transom-plate, and countersunk in the under side of the head-block, substantially as described and shown.

8. In combination with the head-block H, perches P P, and the transom-plate *a*, formed with the arms *b b*, the braces *c c*, on top of the arms *b b*, and extended between and across the transom-plate and head-block, and shouldered against the side of the head-block, substantially as shown and set forth.

HENRY W. PELL.

Witnesses:
F. H. GIBBS,
WM. C. RAYMOND.